Figure 1:
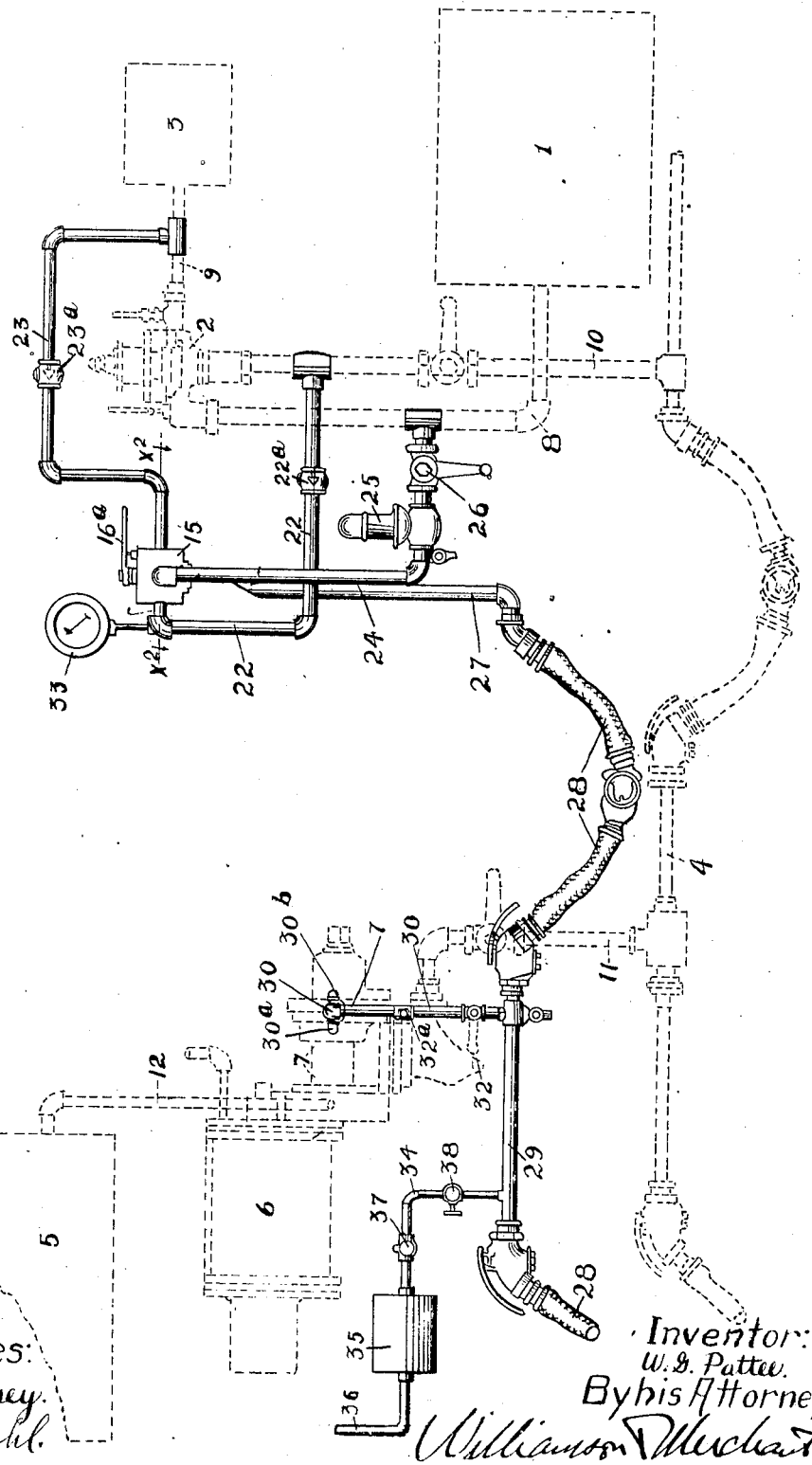

No. 878,468. PATENTED FEB. 4, 1908.
W. G. PATTEE.
AIR BRAKE.
APPLICATION FILED MAR. 11, 1907.

2 SHEETS—SHEET 1.

Witnesses:
Leon B. Losey.
A. H. Opsahl.

Inventor:
W. G. Pattee.
By his Attorneys
Williamson & Merchant

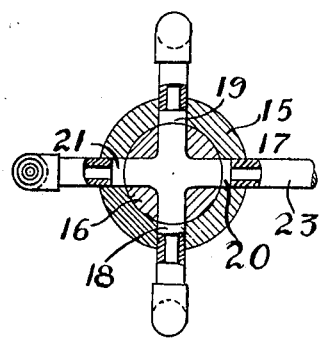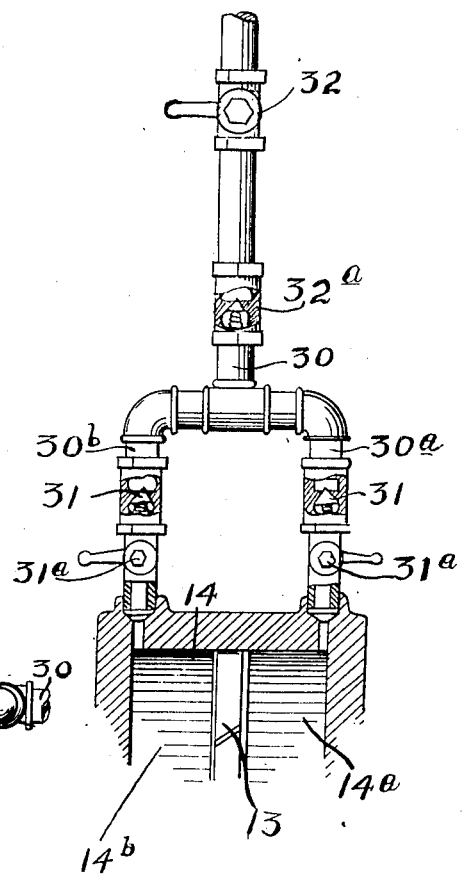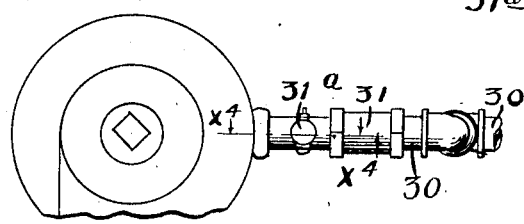

UNITED STATES PATENT OFFICE.

WILLIAM G. PATTEE, OF MINNEAPOLIS, MINNESOTA, ASSIGNOR OF ONE-THIRD TO SAMUEL T. JOHNSON AND TWO-THIRDS TO GEORGE L. MATCHAN, OF MINNEAPOLIS, MINNESOTA.

AIR-BRAKE.

No. 878,468.  Specification of Letters Patent.  Patented Feb. 4, 1908.

Continuation of applications Serial No. 289,227, filed November 27, 1905, and Serial No. 354,844, filed January 30, 1907. This application filed March 11, 1907. Serial No. 361,797.

*To all whom it may concern:*

Be it known that I, WILLIAM G. PATTEE, a citizen of the United States, residing at Minneapolis, in the county of Hennepin and State of Minnesota, have invented certain new and useful Improvements in Air-Brakes; and I do hereby declare the following to be a full, clear, and exact description of the invention, such as will enable others skilled in the art to which it appertains to make and use the same.

My invention relates to air brakes generally, but especially to those of the type well known as the "Westinghouse" and "New York" systems, wherein automatic triple valves are employed.

The primary object of the invention is to provide in these systems means whereby the auxiliary reservoirs may be recharged while the brakes are set.

To the above ends, the invention consists of the novel devices and combinations of devices hereinafter described and defined in the claims.

It is a well known fact that with air brake systems, such as the Westinghouse and New York, it is necessary to release the brakes in order to recharge the auxiliary reservoirs on the several cars of the train. Hence, it frequently happens that by long applications of the brakes and by quickly successive applications of the brakes without sufficient intervening time for recharging the auxiliary reservoirs pressure becomes so reduced that ample braking power is not available, at some critical time when great power is required.

In running down long grades, such as those encountered on mountain roads, the auxiliary reservoir pressure will frequently be reduced to such an extent that it will not hold the brakes properly applied, at a time when the train is still on a steep grade, and, when this occurs, a serious accident is liable to take place because the engineer cannot recharge the auxiliary reservoir without releasing the brakes and letting the train get under great momentum, while he is recharging the auxiliary reservoir.

To partly overcome some of the defects above noted, so-called "brake retainers" have been employed, but these brake retainers have required a great deal of attention and for many reasons have not been satisfactory for the purposes had in view.

In accordance with my invention, I incorporate in the air brake system, a so-called "secondary" train pipe, and provide such connections between said secondary train pipe, the triple valve mechanism, the primary train pipe, main reservoir on the engine and the equalizing reservoir of the engineer's brake valve, that the auxiliary reservoirs may be recharged, while the brakes are set.

The invention is illustrated in the accompanying drawings wherein like characters indicate like parts throughout the several views.

Figure 1 is a view partly in elevation and partly in diagram, showing my invention incorporated in or applied to a standard air brake apparatus, such as a Westinghouse. Fig. 2 is a horizontal section taken through the secondary brake valve on the line $x^2 x^2$ of Fig. 1. Fig. 3 is a detail view in end elevation showing a portion of a standard triple valve and showing a part of the secondary train pipe connection thereto, and Fig. 4 is a detail in horizontal section taken on the line $x^4 x^4$ of Fig. 3.

Of the parts of the standard air brake apparatus, it is sufficient to note the main reservoir 1, engineer's brake valve 2, equalizing reservoir 3, the train pipe 4, and auxiliary reservoir 5, the brake motor 6 and the triple valve 7. The main reservoir 1 is connected to the brake valve 2 by a pipe 8, said brake valve is connected to the equalizing reservoir 3 by a pipe 9, the brake valve 2 is connected to the train pipe 4 by a pipe 10, the train pipe 4 is connected to the triple valve 7 by a pipe 11, and the auxiliary reservoir 5 is connected to said triple valve by a pipe 12. The reservoirs 1 and 3, the brake valve 2 and the connecting pipes 8, 9 and 10 are, of course, mounted on the engine, in the usual way. An auxiliary reservoir, brake motor and triple valve are, of course, mounted on each car, in the usual way. The train pipe, as is usual, is made up of rigid pipe sections mounted on the cars, the engine and the tender, and are connected by a flexible coupling hose of the usual or any suitable construction. It is desirable further to note the triple piston 13 which works in the cylindrical seat 14, and is subject on the side marked $14^a$ to train pressure from the train pipe 4, and on the side marked $14^b$ to auxiliary reservoir pressure.

The so-called "secondary" brake valve is, as shown, in the form of a four-way valve, made up of a case 15 and a rotary valve 16 mounted therein. At its upper end, the valve 16 is provided with a lever $16^a$, by means of which it may be oscillated. The valve 16 has diametrically extended ports 17 that intersect each other at a right angle and coöperate with ports 18, 19, 20 and 21 of the case 15. A pipe 22 extends from the pipe 10 of the standard system and opens into the port 21 of the case 15. Another pipe 23 extends from the port 20 to the pipe 9 that leads to the equalizing reservoir 3, before described. The pipes 22 and 23 are equipped with check valves $22^a$ and $23^a$ to maintain an equalization of pressure on the opposite sides of the engineer's brake valve, to-wit, between the train pipe and the equalization reservoir 3, when the main engineer's brake valve 2 is on the "lap", and the secondary engineer's valve is in use. A pipe 24 leads from the main reservoir pipe 8 and opens into the port 18 of said valve case 15. In this pipe 24 is a governor or reduction valve 25 and, as shown, also a cut-off valve 26. A pipe 27 leads from the port 19 of said case 15 and is connected, by a coupling hose 28, to a secondary train 29, the sections of which are secured to the respective cars and are adapted to be coupled together by usual hose couplings indicated also by the numeral 28. Each section of the train pipe 29 has a branch pipe 30, which, in turn, has sub branches $30^a$ and $30^b$. The sub-branches $30^a$ and $30^b$ open into the valve seat 14 of the triple valve, respectively on the sides $14^a$ and $14^b$ of the head of the triple piston 13. In the sub-branches $30^a$ and $30^b$ are check valves 31 that permit a free flow of air into the valve seat 14, but prevent a flow in a reverse direction. As shown, a cut-off valve 32 is interposed in each branch pipe 30. Each branch pipe 30 is provided with a check valve $32^a$ that works in the same direction as the check valves 31. Also the sub-branch pipes $30^a$ and $30^b$ are provided with normally open cut-off valves $31^a$. The numeral 33 indicates a pressure gage which taps the pipe 22 and serves to indicate the train pipe pressure. The numeral 34 indicates a branch pipe from the secondary train pipe 29 to a storage tank 35 on the car. By a pipe 36 which leads from said air tank, air may be supplied on the car for various purposes, such as for forcing water under pressure to the water tanks and closet bowls, for example. When thus used, a reduction valve 37 and a stop cock 38 would preferably be interposed in the pipe 34. This secondary train pipe may also be used as the air supply pipe to the engineer's signal whistle.

Operation. For the purposes of the illustration hereinafter given, we will assume that the main reservoir 1 normally carries a pressure of 90 pounds, that the maximum train pipe pressure is 75 pounds and that the governor or reduction valve 25 is set to permit a maximum pressure of 65 pounds in the secondary train pipe. It is highly important that the maximum pressure in the secondary train pipe be less than the maximum pressure in the main or primary train pipe, as will hereinafter appear. When the so-called secondary engineer's brake valve is set in the position shown in Fig. 2, it will open up communication between the main reservoir 1, the equalizing reservoir 3, the primary train pipe 4, and the secondary train pipe 29, thereby setting the secondary charging mechanism for automatic action to recharge the auxiliary reservoirs. More fully stated, whenever the brakes are set or applied (at which time the triple piston valve 13 will stand in its intermediate position shown in Fig. 4), and the equalized pressure in the auxiliary reservoir and the brake cylinder, and hence in the chamber $14^a$ and $14^b$ on opposite sides of the triple piston 13, is reduced somewhat below 65 pounds pressure (the assumed pressure carried by the secondary train pipe), the check valves $22^a$, $23^a$, 31 and $32^a$ will automatically open up and admit air into the said two chambers $14^a$ and $14^b$, and train pipe 4 and auxiliary reservoir 5. The air thus admitted under equal pressure into the said chambers $14^a$ and $14^b$, and hence on opposite sides of the triple valve piston 13, will, of course, have no tendency to move the said triple piston, and hence will not release the brakes, but will charge the auxiliary reservoir and, of course, also the main train pipe 4, up to or approximately to the pressure in the secondary train pipe, whereupon the check valves $22^a$, $23^a$, 31 and $32^a$ will close. Air introduced into the chamber $14^b$ when the triple piston is set in its intermediate position, shown in Fig. 4, will, of course, in the usual way, find its passage through the triple valve mechanism into the auxiliary reservoir, thus recharging the said auxiliary reservoir and train pipe 4 while the brakes are set.

As is well known, the release of the brakes is effected by increasing the pressure in the main train pipe and in the chamber $14^a$ of the valve seat 14, above that of the pressure in the chamber $14^b$, so as to thereby force the triple piston 13 toward the left with respect to Fig. 4, and back to its normal or so-called "releasing and charging position". It will be remembered that the greatest pressure that can possibly be introduced into the chambers 14ᵃ and 14ᵇ by air admitted into the secondary train pipe, with the reduction valve set as above assumed, is 65 pounds. The release of the brakes may, therefore, be accomplished by raising the pressure in the main or primary train pipe, and hence in the said chamber 14ᵃ, to 70 pounds. Under this action, the check valve 31 in the sub-branch pipe 30ᵃ prevents flow of air from the chamber 14ᵃ into the chamber 14ᵇ, and hence prevents equalization of the pressure on the opposing sides of the head of the triple piston valve 13, at such time. When the valve 16 of the engineer's secondary brake valve, is given a one-eighth rotation so as to thereby close the four ports 18, 19, 20 and 21, the secondary charging mechanism will be cut out of action.

What I claim and desire to secure by Letters Patent of the United States is as follows:—

1. In an air brake apparatus, the combination with a primary train pipe, main charging reservoir, auxiliary reservoir, brake motor and triple valve, of a secondary train pipe leading from said main reservoir to said triple valve, and having connections for charging said auxiliary reservoir through said triple valve, while the triple piston of said triple valve is in a position to hold the brakes set, substantially as described.

2. In an air brake apparatus, the combination with a primary train pipe, main charging reservoir, auxiliary reservoir, brake motor and triple valve, of a secondary train pipe leading from said main reservoir and having branch conduits opening into the triple piston seat of said triple valve on opposite sides of the triple piston thereof, one of said branch conduits being connected to said auxiliary reservoir through said triple valve mechanism, whereby said auxiliary reservoir may be recharged while said triple piston is in a position to hold the brakes set, substantially as described.

3. In an air brake apparatus of the Westinghouse or New York type, a secondary train pipe leading from the main charging reservoir to one or more of the triple valves and arranged to supply a charge of air to the auxiliary reservoir, while the brakes are set, substantially as described.

4. In an air brake apparatus, of the Westinghouse or New York type, a secondary train pipe receiving air from the main reservoir and delivering the same into the triple piston seat of the triple valve, and a governor or reduction valve set to hold the maximum air pressure in the secondary train pipe below the maximum pressure of a primary train pipe, substantially as described.

5. In an air brake apparatus of the Westinghouse or New York type, a secondary train pipe receiving air from the main reservoir and delivering the same to the triple valve, and provided with a branch pipe arranged to deliver air into the triple piston seat of the triple valve, on the opposite sides of the head of said triple piston, branch pipes from said secondary train pipe, the one communicating with the equalizing reservoir and the other with the primary train pipe, on opposite sides of the primary brake valve, and a secondary brake valve operative, at will, to open up communication between said secondary train pipe and the primary train pipe, main charging reservoir, and equalizing reservoir, substantially as described.

6. The combination with an air brake apparatus of the Westinghouse or New York type, of a secondary train pipe receiving air from the main reservoir through a reduction valve or governor and provided with a branch pipe having sub-branches opening into the triple piston seat of the triple valve, on the opposite sides of the head of said triple piston, the sub-branch on the train pipe side of the head of said valve having a check valve permitting inward, but preventing outward flow of air, branch pipes leading from said secondary train pipe to points on the opposite sides of the engineer's brake valve, and communicating, the one with the primary train pipe and the other with the equalizing reservoir, and a secondary brake valve operative to open up communication between the main reservoir and the primary train pipe, equalizing reservoir and secondary train pipe, substantially as described.

7. In an air brake apparatus, the combination with a primary train pipe, main charging reservoir, auxiliary reservoir, brake motor and triple valve, of a secondary train pipe leading from said main reservoir to said triple valve, and connected to the triple piston seat on opposite sides of the triple piston, and provided with check valves that automatically open to permit air to flow from said secondary train pipe into the opposite sides of said triple piston seat, whereby the auxiliary reservoir may be recharged while the brakes are set, substantially as described.

8. In an air brake apparatus, the combination with a primary train pipe, a main charging reservoir, an auxiliary reservoir, brake motor and triple valve, of a secondary train pipe leading from said main reservoir to said triple valve and connected to the opposite ends of the triple piston thereof, and through said triple valve to said auxiliary reservoir, and a valve equipped branch pipe leading from said secondary train pipe to the air actuated mechanism on the car, substantially as described.

9. In an air brake apparatus, the combination with a primary train pipe, with main charging reservoir, auxiliary reservoir, brake motor and triple valve, of a secondary train pipe leading from said main reservoir to said triple valve, and arranged to deliver air through said triple valve to said auxiliary reservoir and having automatically actuated valve mechanism whereby said auxiliary reservoir may be automatically recharged while the triple piston of said triple valve is in a position to hold the brakes set, substantially as described.

In testimony whereof I affix my signature in presence of two witnesses.

WILLIAM G. PATTEE.

Witnesses:
MALIE HOEL,
F. D. MERCHANT.